United States Patent [19]
Adler

[11] 3,717,819

[45] Feb. 20, 1973

[54] ACOUSTIC WAVE AMPLIFICATION SYSTEM

[75] Inventor: Robert Adler, Northfield, Ill.

[73] Assignee: Zenith Radio Corporation, Chicago, Ill.

[22] Filed: Jan. 26, 1972

[21] Appl. No.: 220,944

Related U.S. Application Data

[63] Continuation-in-part of Ser. No. 82,919, Oct. 22, 1970, abandoned.

[52] U.S. Cl. ....................330/5.5, 307/304, 307/303, 330/35

[51] Int. Cl. ....................H03f 3/16

[58] Field of Search ....................330/5.5

[56] References Cited

UNITED STATES PATENTS 3,678,401 7/1972 Adler ....................330/5.5

*Primary Examiner*—Roy Lake
*Assistant Examiner*—Darwin R. Hostetter
*Attorney*—John J. Pederson et al.

[57] ABSTRACT

Acoustic waves are propagated along a path in a piezoelectric medium. A semiconductive strip is disposed parallel to that path while a plurality of electrodes extend across and are spaced successively along the path. The electrodes in conjunction with the strip comprise a plurality of field effect transistors distributed along the propagation path to intercouple charge carriers in the strip with the waves to achieve amplification. In some versions, the semiconducting strip and the electrodes are all disposed across the acoustic wave propagating path, while in other embodiments only the electrodes are in the acoustic wave path.

29 Claims, 11 Drawing Figures

PATENTED FEB 20 1973 3,717,819

Inventor
Robert Adler
By Francis W. Crotty
Attorney

ACOUSTIC WAVE AMPLIFICATION SYSTEM

CROSS REFERENCE TO RELATED APPLICATION

This application is a continuation-in-part of application Ser. No. 82,919, filed Oct. 22, 1970, assigned to the assignee of the present invention, and now abandoned.

BACKGROUND OF THE INVENTION

The present invention pertains to solid-state amplification systems. More particularly, it relates to traveling-wave acoustic amplification systems.

In recent years, considerable attention has been given to devices in which signal energy is propagated along a medium in the form of acoustic waves. Such devices may serve as delay lines and/or filters. They are particularly attractive in that their frequency selectivity may be tailored essentially as desired. A number of different forms of these devices are disclosed and claimed in copending application Ser. No. 721,038, filed Apr. 12, 1968, now U.S. Pat. No. 3,582,838 in the name of Adrian DeVries and assigned to the same assignee as the present application.

It has also been proposed that drifting charge carriers, such as electrons, be transmitted along the acoustic wave path and caused to interact with the acoustic waves in such a manner that energy is delivered from the charge carriers to the waves with resultant amplification of the latter. The amplification effect is observed when the velocity of the charge carriers is greater than that of the acoustic waves. A variety of devices incorporating such traveling wave amplification are disclosed in U.S. Letters Patent No. 3,388,334 issued June 11, 1968, in the name of Robert Adler and likewise assigned to the assignee of the present application.

However, full exploitation of acoustic wave amplifiers has not yet occurred. This arises at least in part because the semiconducting film required for transmission of the charge carriers must have a reasonably high mobility in order to avoid the need for an unreasonably high direct-current voltage to effect movement of the charge carriers. At the same time, the semiconducting film must have a surface resistance or film resistivity per square that is appropriately related to the dielectric constant of the substrate in which the acoustic waves are propagated. For typical substrates of piezoelectric ceramic material, the desired resistivity is of the order of 50,000 ohms per square. For other substrates such as single-crystal lithium niobate, the required resistivity is even higher. While semiconducting films of such high resistivity are advantageous from the standpoint of reducing direct-current power dissipation, it is not readily feasible to realize the desired combination of parameters. For example, the mobility desirably should be at least 1,000 square centimeters per volt-second for the case wherein the film resistivity is 50,000 ohms per square. These requirements have placed a severe restriction upon the choice of semiconductive material.

SUMMARY OF THE INVENTION

It is, accordingly, a general object of the present invention to provide new and improved solid-state acoustic wave amplification systems that overcome the foregoing limitation upon prior systems.

It is another object of the present invention to provide new and improved acoustic wave amplifiers the fabrication of which is fully compatible with present-day microcircuit techniques.

An amplification system constructed in accordance with the present invention includes a piezoelectric medium propagative of acoustic waves. In response to an input signal, acoustic waves are launched along a path in that medium. An output signal is, in turn, developed in response to the acoustic waves. Disposed across the path and spaced successively therealong are a plurality of elongated conductive electrodes. Finally, amplifying means, comprising these electrodes and a source of power, are included for effectively creating a plurality of solid-state amplifiers, distributed along the acoustic wave path to respond to the acoustic waves for delivering energy from the power source to the acoustic waves.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

FIG. 10 is a transverse sectional view of the FIG. 5 embodiment.

DESCRIPTION OF THE PREFERRED EMBODIMENT

Figures 1, 2, 3, 4, 5, 6:
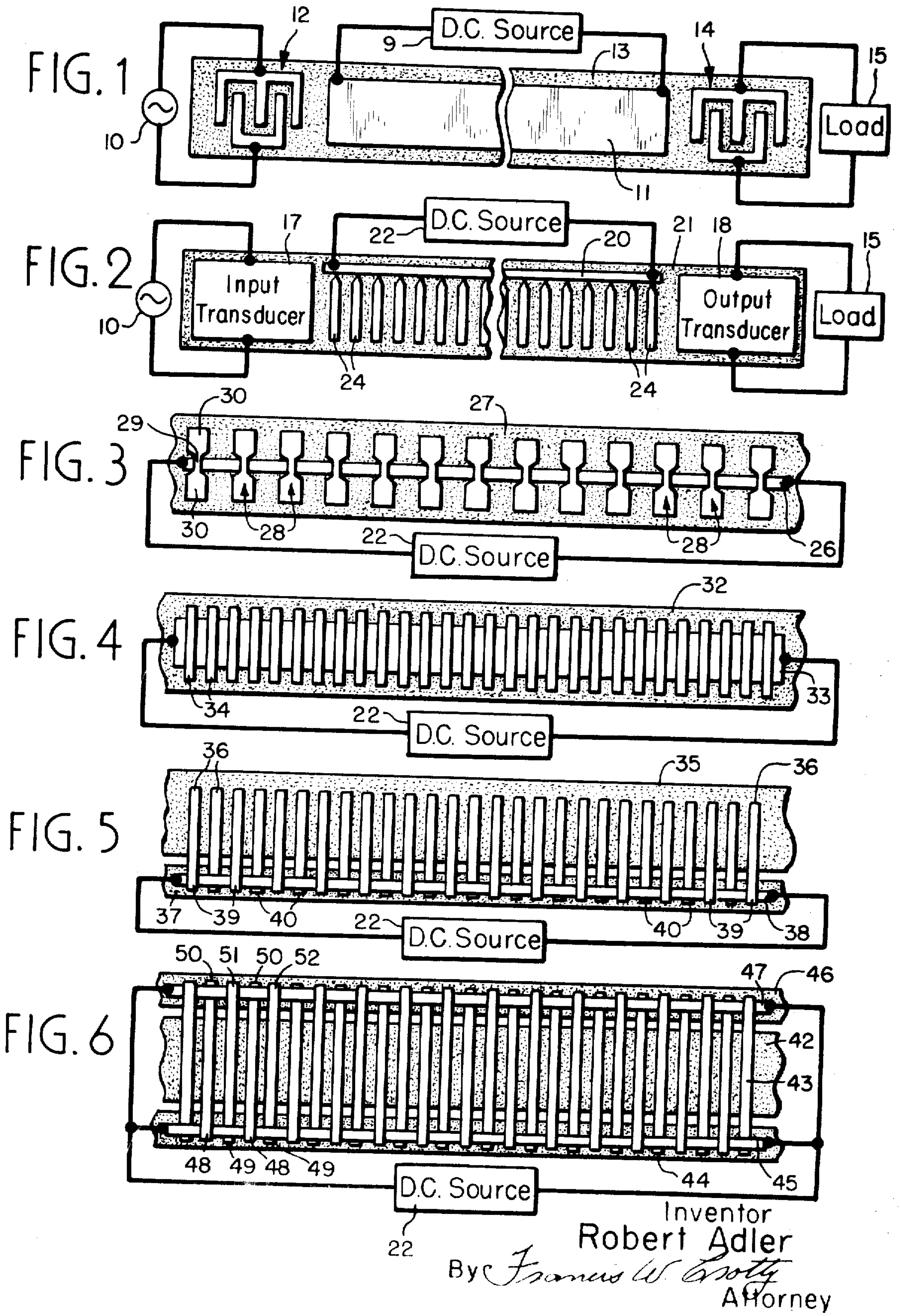
FIG. 1 is a partly schematic plan view of a prior art acoustic wave transmission system.
FIG. 2 is a partly schematic plan view of an acoustic wave transmission system which may be like the system of FIG. 1 but which further includes components that enhance amplification of the acoustic waves.
FIGS. 3–6 are fragmentary plan views of different embodiments of solid-state acoustic wave amplification systems.

For the purpose of explaining the basic nature of acoustic wave transmission systems of the type under consideration, FIG. 1 illustrates a very simple prior art arrangement. While the amplification principles to be described are applicable to any of a variety of wave transmission modes, including compressional waves, flexural waves and shear waves, it is convenient for purposes of illustration, and attractive from the standpoint of utilizing conventional microcircuit techniques and fabrication, to employ the surface-wave mode. Accordingly, FIG. 1 depicts a surface wave system in which a signal source 10 is connected across an input transducer 12 mechanically coupled to an input or a first portion of one major surface of a body of piezoelectric material, shown as a substrate 13 which serves as an acoustic-surface-wave propagating medium. An output or second portion of the same surface of substrate 13, is in turn, mechanically coupled to an output transducer 14 across which a load 15 is connected. Transducers 12 and 14 in this simplest arrangement are identical and are constructed of two comb-type electrode arrays with the conductive teeth of one comb interleaved with the teeth of the other. The combs are of a material, such as gold or aluminum, which may be vacuum deposited on a smoothly-lapped and polished planar surface of the peizoelectric body. The distance between the centers of two consecutive teeth in each array is one-half of the acoustic wavelength in the piezoelectric material of the signal wave for which it is desired to achieve maximum response. The piezoelectric material is one, such as PZT, quartz or lithium niobate, that propagates acoustic surface waves.

The potential developed between any given pair of successive teeth in electrode array 12 produces two waves traveling along the surface of substrate 13, in opposing directions, perpendicular to the teeth for the illustrative isotropic case of a ceramic which is poled perpendicularly to the surface. When the center-to-center distance between the teeth is one-half of the acoustic wavelength of the wave of the desired input frequency, or is an odd multiple thereof, relative maxima of the output waves are produced by piezoelectric transduction in transducer 12. For increased selectivity, additional electrode teeth are added to the comb patterns of transducers 12 and 14. Further modifications and adjustments are described and others are cross-referenced in the aforementioned copending application for the purpose of particularly shaping the response presented by the filter to the transmitted signal.

As thus far described, the arrangement of FIG. 1 is a well-known form of acoustic surface wave filter which exhibits attenuation but which, with the addition of a strip 11 of semiconductive material, such as silicon, and a source 9 of accelerating potential, becomes a known form of acoustic wave amplifier.

The semiconductor film in such an acoustic wave amplifier may be said to act like a continuously distributed field effect transistor (FET). Any intermediate region of the film acts like a drain for the preceding region, like a source for the following region, and like a gate for the surrounding region. There is, however, no need that the simulation of FETs be truly continuous; a simulation of a chain of discrete FETs will suffice so long as there are several per wavelength. At two transistors per wavelength directionality is lost and, consequently approximately three per wavelength constitutes a practical minimum. Theoretical considerations show that the amount of amplification depends on the operating frequency, the coupling factor and dielectric constant of the piezoelectric material and, on the properties of the semiconducting film and the polarity and magnitude of the drift field. The layer thickness, carrier concentration and mobility can be identified as the most important properties of the semiconductor film, influencing the operation of the acoustic amplifier. In practice, it is often found that a certain minimum thickness is needed to obtain a reasonably high mobility. In indium antiomonide (InSb), it is known that the mobility at room temperature is proportional to the thickness for films below approximately 30,000A. The mean free path of the electrons is dependent upon film thickness, reducing the effective mobility as the film thickness decreases. In other films it appears that the desired crystal structure can only be obtained with a minimum film thickness. In practice, therefore, it is difficult, if not impossible, to obtain the correct film resistivity. For the dielectric constants of typical substrates the number of carriers is usually too large and cannot be reduced by reducing the thickness for the reasons cited. The improvements in these matters, made possible by this invention, will be discussed in relation to FIGS. 2–6.

In each of FIGS. 2–6, acoustic waves are launched by an input transducer so as to propagate from the left to the right in the drawing and ultimately induce a signal in an output transducer which is fed to a load. Thus, FIG. 2 includes an input transducer 17 and an output transducer 18 which, while shown simply in block-diagram form, may be identical to the respective transducers of FIG. 1. For clarity of illustration, the input and output transducers are omitted from the drawing in FIGS. 3–6, although it will be understood that they also may be identical to transducers 12 and 14 in FIG. 1. In all cases, the acoustic wavefronts extend substantially across the width of the elongated wave-propagating substrate; that is, the acoustic wave path, which extends from left to right in the drawing, occupies at least most of the substrate surface.

In FIG. 2, the elongated strip 20 of semiconducting material deposited upon piezoelectric substrate 21 is narrow compared to the width of the acoustic wave propagating path and is located near one side of the wave porpagating surface so as to be oriented generally parallel to and positioned within a portion of the acoustic wave path. A direct current source 22 is connected across the opposing ends of strip 20 and produces a drift field which causes charge carriers, such as electrons, to drift in strip 20 at a velocity which is a function of the magnatiude of the voltage from source 22 and in the direction of acoustic wave travel in substrate 21.

Disposed individually across and spaced successively along the acoustic wave propagating path between input transducer 17 and output transducer 18 are a plurality of thin elongated conductive electrodes 24 which may be made of gold or aluminum. Each of electrodes 24 is shaped to a point at its end adjacent to strip 20, the pointed end being in ohmic contact with strip 20. Both strip 20 and electrodes 24 are deposited directly upon the active surface of substrate 21. Electrodes 24 thus constitute taps on strip 20 at regular intervals. Preferably, there are at least three electrodes 24 per wavelength of the acoustic surface waves on substrate 21.

In essence, the arrangement of FIG. 2 is such that electrodes 24, semiconducting strip 20 and substrate 21 together constitute a plurality of field-effect transistors successively distributed along the acoustic wave path. A wave crest located between any particular pair of electrodes 24 increases the conductance of the corresponding portion of strip 20, thus increasing the current therethrough; the immediately preceding electrode then functions as a source and the immediately following electrode serves as a drain. Consequently, the two electrodes instantaneously coact with the piezoelectrically generated field to operate as a field-effect transistor. It is the alternating current flowing into and out of electrodes 24, as they successively become drains and sources, that induces a field back into the piezoelectric medium which reinforces the amplitude of the acoustic waves and hence gives rise to amplification.

In principle, as explained in connection with FIG. 1, the same action would occur without the presence of electrodes 24. That is, any region of strip 20 would act like a drain for a preceding region, like a source for a following region and like a gate for the surrounding region. As mentioned in the introduction, however, the parameters of most available materials are too restrictive for satisfactory operation. Such restrictions are lessened with the apparatus of FIG. 2 by reason of the inclusion of electrodes 24. The FIG. 2 version is particularly attractive for use with a semiconductor material in strip 20 which exhibits satisfactory charge carrier mobility but the resistance per square of which would otherwise be too small. Expressed differently, this embodiment is typical of a system in which the semiconductive material of strip 20 exhibits satisfactory carrier mobility but excessive carrier concentration. The latter is compensated by having the strip appropriately narrowed relative to the width of the acoustic wave propagating path in substrate 21. The fields associated with the traveling acoustive wave produce, through field effect transistor action, alternating currents in the semiconductive strip which are coupled into the piezoelectric substrate by the laterally extending electrodes 24.

The same basic approach is taken in the systems of FIG. 3 and 4. In FIG. 3, a narrow semiconductive strip 26 is deposited lengthwise along a substrated 27, and a plurality of electrodes 28 are affixed individually across strip 26. Each of electrodes 28 includes an intermediate narrow neck 29 where it crosses strip 26 and wider portion 30 on either side of the semiconducting strip. Preferably, the widened portions of the electrodes have the same dimension in the direction of acoustic wave propagation as the separation of successive widened electrode portions. Since neck portions 29 electrically short-circuit strip 26 where they cross, strip 26, in effect, is discontinuous. The purpose of widening electrodes 28 on either side of strip 26 is again to optimize coupling to a piezoelectric material and the use of a narrow semiconductive strip reduces the number of carriers interacting with the piezoelectric substrate as in FIG. 2.

Modifying the basic arrangement still further, in FIG. 4 a substrate 32 carries a semiconductive strip 33 which is significantly wider so as to cover a substantial portion of the surface area of the substrate. In this case, strip 33 is crossed by a plurality of electrodes 34 which are not necked down as in the case of FIG. 3. Consequently, electrodes 34 preempt a substantial portion of the area which might otherwise be covered only by the semiconducting film. However, the objective in the FIG. 4 version is to accommodate a semiconducting material that exhibits what otherwise would be insufficient mobility. Electrodes 34 effect a shortening of the total charge carrier path in the semiconductive strip so as to permit operation with a lower direct-current voltage per unit length. For the purpose of adjusting carrier mobility, it is sufficient that electrodes 34 of appropriate width and spacing be arranged across strip 33. It is not necessary that they extend laterally beyond the strip. However, if the carrier concentration is too great, compensation of that property may be attained by narrowing strip 33 and/or extending the electrodes beyond strip 33 into the acoustic wave propagation path, as illustrated, to achieve results similar to those of the arrangements of FIGS. 2 and 3. The electrodes can be placed between the semiconductive film and the piezoelectric substrate or on top of the film.

In the apparatus of each of FIGS. 2,3 and 4, therefore, the inclusion of a series of discrete electrodes yields the attainment of field-effect amplification while facilitating the use of available materials. Moreover, the different components may be deposited directly upon the underlying substrates by conventional present-day microcircuit disposition techniques.

In the systems of FIGS. 2–4, the semiconducting and piezoelectric materials function in effect as a series of field-effect transistors. Instead of simulated transistors, conventional field-effect transistors may be substituted as illustrated in FIG. 5. In this modification, the acoustic waves are propagated as before along a piezoelectric substratt 35. A plurality of electrodes 36 again are successively spaced along substrate 35 and individually extend across the path of the traveling acoustic surface waves. Spaced alongside substrate 35 is a separate support 37 on which is disposed an elongated semiconducting strip 38 across the ends of which DC potential source 22 is connected. Alternate ones of electrodes 36 have their lower end portions 39 in FIG. 5 disposed immediately over strip 38 while the intervening ones of electrodes 36 have their end portions 40 disposed beneath strip 38. End portions 40 are, however, separated from the material of strip 38 by an insulating film (not shown) which preferably provides sufficient leakage conductance to define the DC potential of each individual strip. Other arrangements for suitably biasing these strips through high-resistance voltage dividers may, of course, also be made. As so arranged, end portions 40 or strips 36 serve as gates for a corresponding series of field-effect transistors formed by the combination with strip 38 of end portions 39. That is, each of end portions 39, except the first and the last, serves as the source connection for one field-effect transistor and as the drain connection for the next. The sources and drains, and hence end portions 39, also may be insulated from strip 38 by an insulating film, provided that the series capacity thus created is sufficiently high.

The operation of the FIG. 5 embodiment follows the same pattern discussed with respect to FIG. 2–4. That is, a wave crest piezoelectrically induces a voltage in an electrode portion 40 which, through field-effect transistor action in strip 38, develops an alternating current in the immediately adjacent ones of end portions 39, and this current induces a field back into substrate 35 that re-enforces the acoustic wave.

In principle, the chain of field-effect transistors may be completely separate from substrate 35, for example being interconnected with electrodes 36 by an appropriate plurality of leads. In practice, it is desirable to form the many interconnections by a single photolithographic process, fabricating the field-effect transistors on support 37, whose upper surface preferably is mechanically mated to the wave propagating surface of substrate 35, so as to permit easy disposition of the interconnections. Of course, the interconnecting leads need not be parallel. Instead, they may converge toward the chain of field-effect transistors so that support 37 may have an overall length substantially less than that of substrate 35. Suitable thin film transistor fabrication techniques of interest are described in a paper entitled "Flexible Transisters, Large Scale Integration and Displays" by Brody et al., which was presented at the Government Microcircuits Conference on Sept. 17, 1969, and was published in a booklet bearing the title of that conference on Aug. 19, 1968, beginning at page 100.

The system of FIG. 6 is similar to that of FIG. 5 except that it includes a second series of field-effect transistors and every one of the wave-interacting electrodes serves as a gate in one of the transistor chains and as a source-drain in the other. Acoustic surface waves again are launched along the upper surface of a substrate 42 across which is disposed an interleaved series of electrodes 43. At one side of substrate 42 is a support 44 which carries an elongated first semiconductor strip 45. Similarly along the other side of substrate 42 is a second support 46 on the surface of which is carried a second semiconducting strip 47. Lower end portions 48 of the even numbered ones of electrodes 43 lie on top of strip 45 so as to function as sources and drains in the same manner as end portions 39 of FIG. 5. Similarly, the lower end portions 49 of the odd numbered one of those electrodes are disposed immediately beneath and insulated from strip 45 so as to serve as gates. On the other hand, upper end portions 50 of the even-numbered ones of electrodes 43 are disposed beneath and insulated from strip 47 to serve as gates. Correspondingly, upper end portions 51 of the intervening electrodes lie on top of strip 47 to serve there as sources and drains. DC source 22 is connected across strips 45 and 47 in parallel.

In operation, each of electrodes 43 responds to acoustic waves and acts as a gate to initiate transistor action in one of the chains, while at the same time each of electrodes 43 also serves as a field inducing source or drain for alternating currents engendered by the gating action of an adjacent one of electrodes 43. That is, each of the electrodes responds to the acoustic waves by bunching the charge carriers in one of the semiconducting strips while it also responds to bunches of charge carriers in the other of the strips by delivering energy back to the acoustic waves. Again as in the earlier embodiments, the electrodes are intercoupled with a plurality of solid-state amplifiers distributed along the acoustic path. The amplifiers respond to the action of the acoustic waves for delivering energy from the DC power source to the acoustic waves. Of course, transistor arrangements 44, 45, 48, 49 and 46, 47, 50, 51 need not be positioned on opposite sides of piezoelectric substrate 42. While less convenient, both arrangements may be located on the same side of substrate 42.

In both of the systems of FIG. 5 and 6, it will be immediately apparent that the characteristics of the semiconducting material may be completely divorced from the surface properties of the piezoelectric substrate that propagates the wave energy. This permits the use of the most favorable material, e.g., glass or mics, for supports 37, 44 and 46 upon which the field-effect transistors are deposited. In addition, the field effect transistor regions overlying gate electrodes 40, 49 and 50 may, by suitable choice of the effective width of the gate region, be adapted to the mobility of the semiconductor material, while the transverse dimension of semiconductor strips 38, 45 and 47 may be selected to match the carrier concentration to the piezoelectric substrate.

It has been stated above with reference to the FIG. 5 embodiment that end portions 40 of electrodes 36 (the gates) are insulated from the semiconductive strip 38 by an insulating film located between end portions 40 and the strip 38. The insulating film (not shown) is stated to preferably provide sufficient leakage conductance to define the DC potential of each individual gate electrode. The FIG. 5 embodiment is thus said to illustrate an embodiment wherein amplification is achieved by a plurality of "conventional" field-effect transistors. As is well-known, to achieve field-effect transistor action, the gate electrode must be insulated from the semiconductive material conducting the carrier current.

It is also stated above that the sources and drains, and hence end portions 39 of strip electrodes 36, also may be insulated from the semiconductive strip 38 by an insulating film, provided that the series capacity thus created is sufficiently high.

It follows implicity and is inherent that in field-effect transistor structures of the nature described having all electrodes (source, drain and gate) similarly insulated from the semiconductive medium, as described, the distinctive character of the electrodes as sources, drains, or gates is lost, all electrodes having common functions.

These descriptive statements contemplate and encompass many other arrangements than those shown in FIG. 5 and 6 in which the source, drain, and gate electrodes are each insulated from the semiconductive medium. Among the many possible other implementations of this aspect of the invention are the embodiments shown in FIG. 7 and FIG. 11.

Before undertaking a detailed description of the FIGS. 7 and 11 embodiments, a further treatment of the background of a pertinent aspect of the invention will be given. It has been suggested above that indium antimonide and lithium niobate are among the most useful semiconductive and piezoelectric materials available today for use in fabricating acoustic wave amplifiers of the nature described. However, in spite of the fact that these materials are perhaps the most suitable of the materials available today, the conductivity of indium antimonide, even in films as thin as 500 angstroms for example, is so high that the match to a lithium niobate substrate is poor. The nature of this mismatch is explained below.

In a publication entitled Simple Theory of Acoustic Amplification, authored by myself and appearing in *IEEE Transactions*, July 1971, SU-18 pages 115-118, an equation for the loss per radian $a/k_o$ was given in the form:

$$a/k_o = \tfrac{1}{2}K^2 (\gamma\omega\tau)/[1 + (\gamma\omega\tau)^2] \quad (1)$$

where $K$ = electromechanical coupling factor, $-\gamma$ = excess velocity of carriers normalized to the velocity $V_o$ of the acoustic waves, $\omega$ = signal frequency, and $\tau$ a time constant which is strongly affected by device geometry. That publication showed (p. 117) that for the film-type surface wave amplifier, $$\gamma\omega\tau = [\gamma V_o(\epsilon + \epsilon_o)]/\theta\sigma$$

where $\epsilon$ and $\epsilon_o$ are the permittivities of the substrate and free space and $\theta$ and $\sigma$ are the thickness and conductivity of the film ($\theta\sigma$ is its sheet conductivity).

Maximum gain $a/k_o = \tfrac{1}{4}K^2$ occurs for $\gamma\omega\tau = -1$. Inserting typical experimental data such as $\gamma = -2$ (carriers drift at three times synchronous velocity), $$V_o = 3000 \text{ m/sec. } \epsilon + \epsilon_o = 30\epsilon_o = 2.7 \times 10^{-10} \text{ F/m},$$

the numerator $\gamma V_o (\epsilon + \epsilon_o)$ becomes $-1.6 \times 10^{-6}$ mho while the sheet conductivity is about $30 \times 10^{-6}$ mho, about 20 times larger. Thus, $-\gamma\omega\tau$ is only about 0.05.

The FIGS. 5 and 6 embodiments discussed above, as well as the below-discussed alternative FIGS. 7 and 10 embodiments may be viewed as each representing a solid-state acoustic wave amplification system including a piezoelectric medium propagative of acoustic waves, input and output transducers for launching and receiving acoustic waves along a path in the medium, and acoustic wave amplifying means. The acoustic wave amplifying means comprises a semiconductive medium, anisotropically electrically conductive coupling means coupling the piezoelectric medium and the semiconductive medium, insulating means for insulating the coupling means from the semiconductive medium to establish field effect transistor action in the semiconductive medium, and means for connecting the semiconductive medium to a source of D.C. voltage for establishing a carrier drift velocity in the semiconductive medium which is effectively greater than the phase velocity of said acoustic waves in the piezoelectric medium such that traveling waves developed in the piezoelectric medium are amplified.

In the FIG. 5 embodiment the coupling means is, of course, the electrodes or strips 36; in the FIG. 6 embodiment the coupling means is the array of electrodes 43. FIG. 7 depicts an alternative embodiment of the invention within the compass of the above-described inventive concepts, comprising a piezoelectric substrate 60, which may, for example, be lithium niobate, upon which is disposed coupling means which is anisotropically electrically conductive, herein intended to mean that it is substantially more conductive in the direction of coupling than in the effective direction of acoustic wave propagation. The coupling means is here shown in the form of a periodic array of coupling electrodes 62, a portion of transverse width $W_L$ (i.e. in a direction transverse to the direction of propagation of acoustic waves in the piezoelectric substrate 60) of each of which is interfaced with the substrate 60.

As discussed above with respect to the FIGS. 1–6 embodiments, three or more electrodes per wavelength are preferably provided. The strips may be deposited by any of a number of well-known metalization techniques.

An insulating layer 64, preferably a very thin layer of a material having a relatively high dielectric constant such as silicon oxide, silicon dioxide, hafnium oxide or tantalum pentoxide is disposed upon the array of coupling electrodes 62. A strip 66 of semiconductive material, which may, for example, be indium antimonide, is disposed on the insulating layer 64. The portion of each of electrodes 62 which is interfaced with the strip 66 of semiconductive material is designated in FIG. 7 as having a transverse width $W_S$.

If the series reactance of the insulating layer 64 were negligible, the result would be equivalent to increasing the permittivity $\epsilon$ of the piezoelectric substrate 60 by the width ratio $W_L/W_S$, thus achieving an effective permittivity $\epsilon_e = \epsilon \cdot W_L/W_S$. Taking into account the effect of the insulating layer 64, but neglecting the effect of finite gaps between adjacent electrodes 62 (assume continuous electrodes 62 which conduct transversely but not longitudinally), it can be shown that the total effective capacitance $C_{eff}$, as seen from the semiconductive strip 66, equals $cW_L\epsilon k$, where $\epsilon$ is the permittivity of the piezoelectric substrate 60, $k$ is the acoustic wave number and $c$ is a reduction factor, $$c = W_S/[W_S + W_L (\epsilon/\epsilon_S)k\,\theta_S]$$

where $\epsilon_S$ and $\theta_S$ are the permittivity and thickness of the insulating layer 64. The layer 64 is very thin ($k\theta_S << 1$).

Without the added electrodes 62, the capacitance seen from the semiconductive strip 66 (neglecting the intervening insulating layer 64) would have been $W_S \epsilon k$; the capacitance per unit length has therefore been increased by a factor $cW_L/W_S$, corresponding to an effective permittivity $\epsilon_e = \epsilon \cdot c\, W_L/W_S$. This results in an increase in $\gamma\omega\tau$ by the same factor.

In computing the gain, the squared coupling factor ($K^2$) must also be multiplied by the reduction factor $c$, to allow for energy uselessly stored in the insulating layer. The original equation (1) for the loss per radian was $$a/k_o = \tfrac{1}{2}K^2 (p/1+p^2), \quad \text{where } p = \gamma\omega\tau;$$

The revised expression reads $$a'/k_o = c(K^2/2)\,(p'/1+p'^2)$$

where $p' = (c\, W_L/W_S)p$. (2)

and the asymptote (for $p << 1$) is $$a'/k_o = c^2\,(W_L/W_S)\,(K^2/2)\,p. \quad (3)$$

The steepest asymptote is obtained when $c = 0.5$, and is achieved by making $W_L/W_S = \epsilon_S/k\theta_S\epsilon$.

Figures 7, 8, 9, 10:
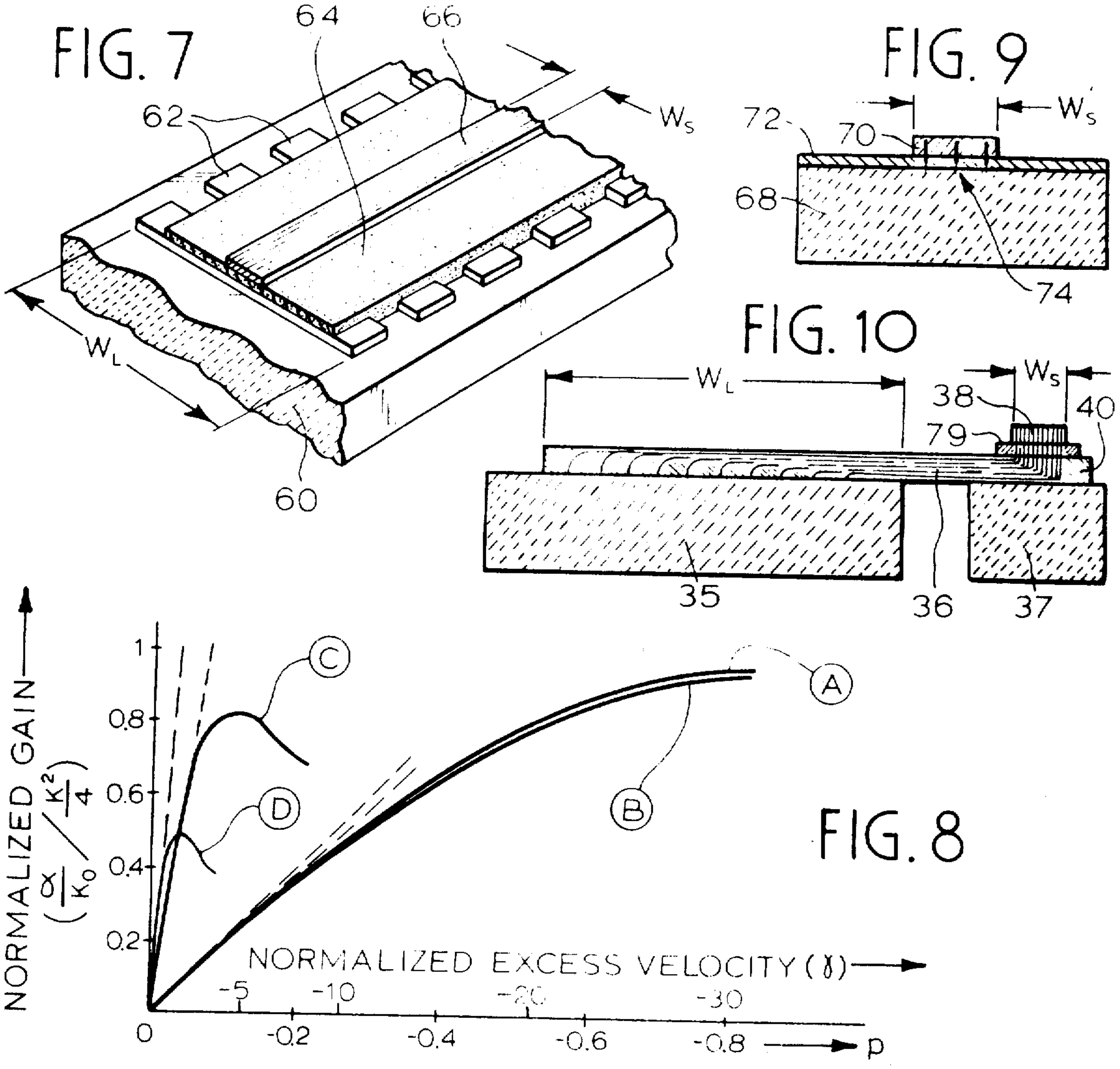
FIG. 7 is a schematic perspective fragmentary view of a portion of an alternative wave amplification system which may be constructed according to the teachings of this invention.
FIG. 8 is a diagram illustrating performance characteristics of wave amplification systems following this invention.
FIGS. 9 and 10 are schematic sectional views of prior art and present invention structures which are intended to illustrate the principles of this invention.

FIG. 8 shows examples of what may be accomplished by application of the principles of this invention. In FIG. 8 gain per radian is normalized with respect to the maximum obtainable value. Excess carrier velocity is plotted horizontally in terms of $$p = \gamma\omega\tau = [\gamma V_o(\epsilon + \epsilon_o)]/\theta\sigma.$$

Reference curve A is a portion of the well-known gain curve between synchronism ($p = 0$) and max. gain ($p =$ −1). Substituting $LiNbO_3$ values for $V_o$ and $\epsilon$, and setting $\theta\sigma = 30.10^{-6}$ mho, one obtains $\gamma = 37.5\ p$; corresponding values of $\gamma$ are marked on the horizontal axis.

Curves B, C and D further assume an oxide film ($\epsilon_S = 4\epsilon_o$) of 300 A thickness, and a signal frequency of 43 MHz. Curve B depicts results obtained *without* the use of coupling electrodes 62 according to this invention; the series capacitance of the insulating layer 64 causes slight reductions in gain and effective permittivity $\epsilon_e$. Curve C shows the improvement obtained using metal electrodes 62 with $W_L/W_S = 10$. Curve D depicts the case $W_L/W_S = 50$, where the asymptote has maximum slope and $\epsilon_e = 25\epsilon$. The gain obtained from curve B (no coupling electrodes employed) at $\gamma = -2$ is achieved on curve D at $\gamma = -0.16$, with a greater than six-fold reduction in power dissipation.

Thus, it is clearly seen that employment of coupling electrodes according to this invention results in substantially greater gain for a given input power, or alternatively, equal gain at substantially reduced levels of input power.

FIGS. 9 and 10 illustrate prior art and present invention structures from the viewpoint of the coupling between the piezoelectric and semiconductive media. FIG. 9 illustrates a typical prior art structure comprising a piezoelectric substrate 68, a narrow semiconductive strip 70, and an oxide layer 72 for chemically isolating the substrate 68 and strip 70. Electric flux lines coupling the piezoelectric substrate 68 and semiconductive strip 70 are shown at 74.

FIG. 10 is a view of a transverse cross-section of the FIG. 5 embodiment taken through a gate electrode. The insulating film described above, but not shown in FIG. 5, is designated by reference numeral 79. The electric flux lines per unit of area coupled to the strip 36 is the same as the flux lines per unit of area coupled to the semiconductive strip 70 in FIG. 9, assuming that the piezoelectric substrates in the FIG. 9 and FIG. 5 structures are the same and thus have like permittivity. However, since the transverse width $W_L$ of the portion of strip electrode 36 which is interfaced with substrate in FIG. 10 is greater than the width $W_S'$ of the semiconductive strip 70 in FIG. 9 (assumed to be equal to the width $W_S$ in FIG. 10) by the ratio $W_L/W_S$, and since nearly all flux lines originating in piezoelectric medium 35 must terminate in semiconductive strip 38 (the permittivity of the surrounding air being relatively low), it is evident that the effective permittivity $\epsilon_e$ of the piezoelectric medium 35, as seen from the semiconductive strip 38, is increased by approximately the ratio $W_L/W_S$. For a preselected carrier drift velocity $V_c$, the normalized excess velocity factor is $\gamma = -(V_c - V_o)/V_o$; the gain peak ($p' = -1$) is reached when the effective permittivity $\epsilon e = -\theta\sigma/\gamma V_o$ FIG. 7 illustrates a structure wherein the piezoelectric medium utilized has a permittivity which is lower than is required for optimum amplification, and wherein the ratio of the transverse widths $W_L$ to $W_S$ of the portions of electrodes 62 interfaced with the piezoelectric and semiconductive media, respectively, is selected larger than unity in order to correspond to a desired *increase* in the permittivity of the piezoelectric medium. Further, FIG. 7 depicts a laminate acoustic wave amplification system wherein the constituent layers are in stacked relationship, the semiconductive medium being disposed directly upon THE insulating layer which establishes field effect transistor action in the system.

Figure 11:
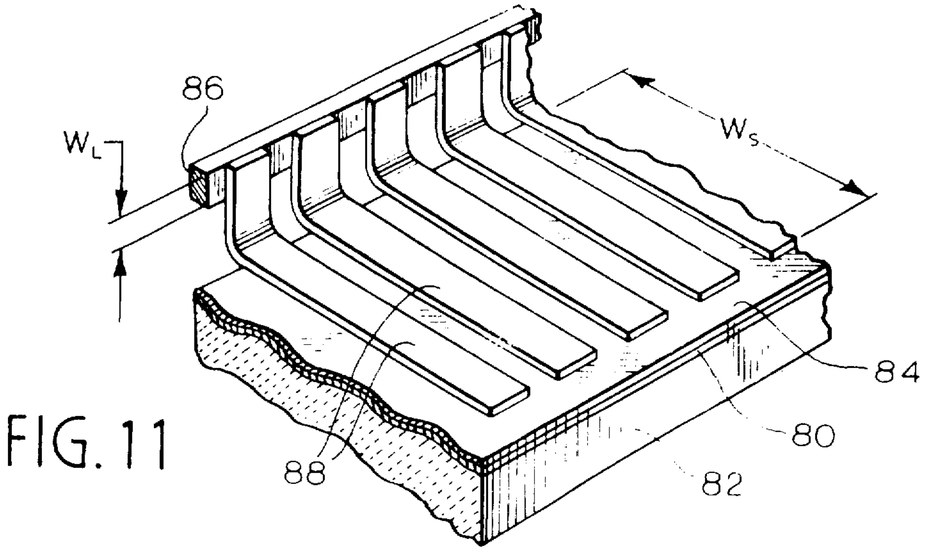
FIG. 11 is yet another embodiment of this invention.

FIG. 11 illustrates another of the many possible embodiments contemplated by the principles of this invention, wherein the piezoelectric medium has a permittivity which is *higher* than that required for optimum amplification, and wherein the semiconductive medium is illustrated as being disposed on a substrate which is spatially separated from the piezoelectric medium, as shown also in the FIGS. 5 and 6 embodiments.

The FIG. 11 is shown as comprising a semiconductive medium in the form of a very thin layer 80 of silicon, a high resistivity semiconductive material, which may be deposited, for example, by well-known epitaxial deposition techniques, on a compatible substrate 72 such as sapphire. An insulating layer 84, which may be composed, for example, of silicon oxide or other suitable oxides is deposited on the semiconductive layer 80.

The FIG. 11 embodiment includes a high permittivity piezoelectric material, here shown in the form of a bar 86 of PZT (lead zirconate titanate), for example. Coupling means in the form of a periodic array of electrically conductive electrodes 88 couple the semiconductive layer 80 and the piezoelectric bar 86.

In order to match the high permittivity piezoelectric medium with the high resistivity semiconductive medium, the transverse width $W_S$ (transverse to the effective direction of acoustic wave propagation) of the portion of electrodes 88 interfaced with the semiconductive layer 80 is selected to be sufficiently *greater* than the transverse width $W_L$ of the portion of each of the electrodes 88 interfaced with the piezoelectric bar 86 to produce the desired *decrease* in the effective permittivity of the bar 86. Thus in the FIG. 11 embodiment, as well as in the FIG. 7 and earlier-described embodiments, anisotropic coupling means are provided in which the ratio of the transverse width $W_L$ of the portion of said coupling means interfaced with said piezoelectric medium to the transverse width $W_S$ of the portion of the coupling means interfaced with the semiconductive medium is selected to correspond to a desired change in the permittivity of the piezoelectric medium employed.

The FIGS. 7 and 11 embodiments are shown only fragmentarily; a source of D.C. voltage, input and output acoustic wave transducers, and other ancillary structure are omitted in the interest of clarity of illustration of the invention.

The invention is not limited to the particular details of construction of the embodiments depicted, and other modifications and applications are contemplated. For example, various geometrical relationships of piezoelectric and semiconductive media, other than those shown, are contemplated since the use of coupling means according to this invention introduces a high degree of independence in the relative orientations, geometries, and locations of the piezoelectric and semiconductive media. The coupling means has been described above as being anisotropic, contemplating other structures than arrays of electrically conductive strips as shown. For example, oriented sheet conductor having substantially greater conductivity in the direction of coupling than in the direction of wave propagation may be employed. Certain other changes may also be made in the above-described apparatus without departing from the true spirit and scope of the invention herein involved, and it is intended that the subject matter of the above depiction shall be interpreted as illustrative and not in a limiting sense.

I claim:

1. A solid-state acoustic-wave amplification system comprising:

a piezoelectric medium propagative of acoustic waves;

means responsive to an input signal for launching acoustic waves along a path in said medium;

means responsive to said acoustic waves for developing an output signal;

and a series of field effect transistors comprised of a source of power, a strip of semiconductive material in parallel relation to said piezoelectric medium, and a plurality of electrodes connected to said source and disposed transversely of both said semiconductive strip and said medium in coupling relation thereto with all but the first and last of said electrodes individually constituting the source connection for one and the drain connection for the next transistor of said series for delivering energy from said source to said acoustic waves.

2. A system as defined in claim 1 in which one end of each of said electrodes is in ohmic contact with said semiconductive strip.

3. A system as defined in claim 1 in which said electrodes are in ohmic contact with said semiconductive strip and in which said source causes movement of charge carriers in said strip parallel to said path, in the direction of propagation of said acoustic waves, and at a velocity greater than that of said acoustic waves.

4. A system as defined in claim 1 in which said semiconductive strip is disposed within said path of acoustic wave propagation in said medium.

5. A system as defined in claim 4 in which said electrodes are also disposed in said path and extend from both sides of said strip.

6. A system as defined in claim 5 in which said electrodes have a narrow neck portion superposed over said semiconductive strip and widened portions extending from both sides of said strip.

7. A system as defined in claim 6 in which the widened portions of said electrodes are spaced from the adjacent electrodes by an amount approximately equal to the width of said widened portions.

8. A system as defined in claim 1 which includes a second plurality of electrodes interleaved with the electrodes of the first-mentioned plurality and constituting the gate connection of respective ones of said transistors.

9. A system as defined in claim 8 in which a second and similar semiconductive strip is disposed along said medium, and in which both of said pluralities of electrodes extend in coupling relation over both of said strips to define therewith two series of field effect transistors with an electrode constituting the aforesaid source-drain connections in one transistor series constituting the drain connection in the other transistor series and vice versa.

10. A solid-state acoustic wave amplification system comprising:

a piezoelectric medium propagative of acoustic waves;

means responsive to an input signal for launching acoustic waves along a path in said medium;

means responsive to said acoustic waves for developing an output signal; and acoustic wave amplifying means, comprising:

a semiconductive medium, electrically conductive coupling means coupling said piezoelectric medium and said semiconductive medium, said coupling means being substantially more conductive in the direction of coupling than in the direction of acoustic wave propagation, and means for connecting said semiconductive medium to a source of D.C. voltage for establishing a carrier drift velocity in said semiconductive medium which is effectively greater than the phase velocity of said acoustic waves in said piezoelectric medium such that traveling waves developed in said piezoelectric medium are amplified.

11. The system defined by claim 10 wherein said coupling means comprises a plurality of spaced electrically conductive electrodes.

12. The system defined by claim 11 including means for electrically insulating at least some of said electrodes disposed at periodic intervals along said piezoelectric medium from said semiconductive medium to establish a field effect transistor action in said semiconductive medium.

13. The system defined by claim 11 including means for insulating said electrodes from said semiconductive medium to establish field effect transistor action in said semiconductive medium.

14. A solid-state acoustic wave amplification system comprising:

a piezoelectric medium propagative of acoustic waves;

means responsive to an input signal for launching acoustic waves along a path in said medium;

means responsive to said acoustic waves for developing an output signal; and acoustic wave amplifying means, comprising:

a semiconductive medium, electrically conductive coupling means coupling said piezoelectric medium and said semiconductive medium, said coupling means being substantially more conductive in the direction of coupling than in the direction of acoustic wave propagation, insulating means for insulating said coupling means from said semiconductive medium to establish field effect transistor action in said semiconductive medium, and means for connecting said semiconductive medium to a source of D.C. voltage for establishing a carrier drift velocity in said semiconductive medium which is effectively greater than the phase velocity of said acoustic waves in said piezoelectric medium such that traveling waves developed in said piezoelectric medium are amplified.

15. The system defined by claim 14 wherein said coupling means comprises a plurality of periodically spaced electrodes.

16. The system defined by claim 15 wherein the spacing between said electrodes is no greater than one-third of the period of the highest frequency acoustic wave to be amplified.

17. The system defined by claim 15 wherein said piezoelectric medium has a permittivity which is lower than is required for optimum acoustic wave amplification, and wherein the ratio of the transverse width $W_L$ of a portion of each of said electrodes which is interfaced with said piezoelectric medium to the transverse width $W_S$ of a portion of each of said electrodes which is interfaced with said semiconductive medium is selected to correspond to a desired increase in the permittivity of said piezoelectric medium.

18. The system defined by claim 15 wherein said semiconductive medium is disposed upon a substrate spaced from said piezoelectric medium.

19. The system defined by claim 18 wherein said electrodes converge from said piezoelectric medium toward said semiconductive medium so that said semiconductive medium may have an overall length substantially less than said piezoelectric medium.

20. A solid-state acoustic wave amplification system comprising:

a semiconductive medium a piezoelectric medium propagative of acoustic waves having a permittivity which in association with said semiconductive medium is different from that which is required for optimum acoustic wave amplification;

means responsive to an input signal for launching acoustic waves along a path in said medium;

means responsive to said acoustic waves for developing an output signal;

electrically conductive coupling means coupling said piezoelectric medium and said semiconductive medium, said coupling means being substantially more conductive in the direction of coupling than in the direction of acoustic wave propagation, the ratio of the transverse width $W_L$ of or portion of said coupling means interfaced with said piezoelectric medium to the transverse width $W_S$ of a portion of said coupling means interfaced with said semiconductive medium being selected to correspond to a desired change in the permittivity of said piezoelectric medium;

insulating means for insulating said coupling means from said semiconductive medium to establish field effect transistor action in said semiconductive medium; and means for connecting said semiconductive medium to a source of DC voltage for establishing a carrier drift velocity in said semiconductive medium which is effectively greater than the phase velocity of said acoustic waves in said piezoelectric medium such that traveling waves developed in said piezoelectric medium are amplifed.

21. The system defined by claim 20 wherein said coupling means comprises a plurality of periodically spaced electrodes, the spacing between said electrodes being no greater than one-third of the period of the highest frequency acoustic wave to be amplified.

22. The system defined by claim 21 wherein said semiconductive medium is disposed upon a substrate spaced from said piezoelectric medium.

23. The system defined by claim 22 wherein said electrodes converge from said piezoelectric medium toward said semiconductive medium so that said semiconductive medium may have an overall length substantially less than said piezoelectric medium.

24. The system defined by claim 21 in the form of a laminate comprising at least the following layers in the order named: said piezoelectric medium acting as a substrate, said electrodes oriented transverse to the direction of acoustic wave propagation, said insulating means in the form of a thin layer, and said semiconductive medium in the form of a narrow strip oriented in the effective direction of acoustic wave propagation.

25. A solid-state acoustic wave amplification system comprising a piezoelectric medium capable of propagating acoustic waves at a nominal velocity $V_o$ and having a predetermined permittivity $\epsilon_o$;

means responsive to an input signal for launching acoustic waves along a path in said medium;

means responsive to said acoustic waves for developing an output signal;

a semiconductive medium having a predetermined film resistivity $\gamma$;

means for connecting said semiconductive medium to a source of D.C. voltage for establishing a carrier drift velocity $V_c$ in said semiconductive medium;

electrically conductive coupling means coupling said piezoelectric medium and said semiconductive medium such that said piezoelectric medium appears to have an effective permittivity $\epsilon_e = -\theta\sigma/\gamma V_o$, where $\gamma = -(V_c - V_o)/V_o$, said coupling means being substantially more conductive in the direction of coupling than in the direction of acoustic wave propagation.

26. The system defined by claim 25 wherein said coupling means comprises a plurality of periodically spaced electrically conductive electrodes arranged transverse to the direction of acoustic wave propagation.

27. The system defined by claim 24 including means for electrically insulating said electrodes from said semiconductive medium to establish field effect transistor action in said semiconductive medium.

28. A laminate solid-state acoustic wave amplification system comprising, in stacked relationship:

a piezoelectric medium propagative of acoustic waves and adapted to receive at spaced points thereon input and output acoustic transducers, said medium having a permittivity which is substantially less than is required for optimum amplification;

a field effect transistor amplifier for amplifying acoustic waves traveling in said piezoelectric medium, comprising:

a plurality of periodically spaced, electrically conductive coupling electrodes supported by said piezoelectric medium and electrically coupled thereto and being substantially more conductive in the direction of coupling than in the direction of acoustic wave propagation, said electrodes being oriented transverse to the direction of acoustic wave propagation;

a strip of semiconductive material oriented in the direction of acoustic wave propagation, said strip being adapted for connection to a source of DC voltage, the width of said coupling electrodes being substantially greater than the width of said strip of semiconductive material in a direction transverse to the effective direction of acoustic wave propagation;

a thin insulating layer separating said semiconductive strip from said coupling electrodes; and a source of DC voltage for establishing a carrier drift velocity in said semiconductive strip which is effectively greater than the phase velocity of said acoustic waves such that traveling waves developed in said piezoelectric medium are amplified.

29. A solid-state acoustic wave amplification system comprising:

a piezoelectric medium propagative of acoustic waves;

means responsive to an input signal for launching acoustic waves along a path in said medium;

means responsive to said acoustic waves for developing an output signal; and acoustic wave amplifying means, comprising:

a semiconductive medium, a plurality of electrically conductive electrodes disposed upon and periodically spaced along said semiconductive medium to effect a shortening of the total charge carrier path in said semiconductive medium, the spacing between said electrodes being no greater than one-third of the period of the highest frequency acoustic wave to be amplified; and means for connecting said semiconductive medium to a source of D.C. voltage for establishing a carrier drift velocity in said semiconductive medium which is effectively greater than the phase velocity of said acoustic waves in said piezoelectric medium such that traveling waves developed in said piezoelectric medium are amplified.

* * * * *